(12) United States Patent
McDevitt

(10) Patent No.: US 10,270,844 B2
(45) Date of Patent: *Apr. 23, 2019

(54) SYSTEM AND METHOD FOR INTEGRATING AN ELECTRONIC POINTING DEVICE INTO DIGITAL IMAGE DATA

(71) Applicant: HSNi, LLC, St. Petersburg, FL (US)

(72) Inventor: John McDevitt, Clearwater, FL (US)

(73) Assignee: HSNi, LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,039

(22) Filed: Mar. 9, 2018

(65) Prior Publication Data

US 2018/0198849 A1 Jul. 12, 2018

Related U.S. Application Data

(63) Continuation of application No. 15/040,021, filed on Feb. 10, 2016, now Pat. No. 9,948,701, which is a
(Continued)

(51) Int. Cl.
| | |
|---|---|
| *H04H 60/33* | (2008.01) |
| *H04L 29/08* | (2006.01) |
| *H04N 21/4725* | (2011.01) |
| *H04N 21/4728* | (2011.01) |
| *G06F 3/038* | (2013.01) |

(Continued)

(52) U.S. Cl.
CPC ............. *H04L 67/10* (2013.01); *G06F 3/038* (2013.01); *G06F 3/0346* (2013.01); *G06Q 30/0601* (2013.01); *H04L 65/60* (2013.01);

*H04N 5/4403* (2013.01); *H04N 21/42204* (2013.01); *H04N 21/42207* (2013.01); *H04N 21/42222* (2013.01);
(Continued)

(58) Field of Classification Search
CPC ..... H04N 21/440227; H04N 21/42222; H04N 21/44; H04N 21/44218; H04N 21/4728
See application file for complete search history.

(56) References Cited

U.S. PATENT DOCUMENTS

| | | | |
|---|---|---|---|
| 4,737,773 A | 4/1988 | Kobayashi | |
| 5,192,943 A * | 3/1993 | Matsuo | G09G 5/08 345/545 |

(Continued)

*Primary Examiner* — Pankaj Kumar
*Assistant Examiner* — Timothy R Newlin
(74) *Attorney, Agent, or Firm* — Arent Fox LLP

(57) ABSTRACT

A method and system is provided for creating an integrated video stream based on relative location and movement of a wireless pointing device. The system includes a receiver for continuously receiving position data from a wireless pointing device and a processor for calculating an initial position and orientation of the wireless pointing device based on the position data received from the wireless pointing device, accessing additional data from a secondary source based on input data received from the wireless pointing device, and creating the integrated video stream based on an original video stream, the initial position and orientation of the wireless pointing device and the additional data accessed from the secondary source. The system further includes a server for transmitting the integrated video stream to the wireless pointing device to be rendered on a screen thereof.

30 Claims, 4 Drawing Sheets

Related U.S. Application Data continuation of application No. 14/712,269, filed on May 14, 2015, now Pat. No. 9,294,556, which is a continuation of application No. 14/218,186, filed on Mar. 18, 2014, now Pat. No. 9,094,707, which is a continuation of application No. 13/165,364, filed on Jun. 21, 2011, now Pat. No. 8,717,289.

(60) Provisional application No. 61/357,379, filed on Jun. 22, 2010.

(51) Int. Cl.
*G06F 3/0346* (2013.01)
*H04N 5/44* (2011.01)
*H04N 21/422* (2011.01)
*G06Q 30/06* (2012.01)
*H04L 29/06* (2006.01)

(52) U.S. Cl.
CPC ... *H04N 21/42224* (2013.01); *H04N 21/4725* (2013.01); *H04N 21/4728* (2013.01)

(56) References Cited

U.S. PATENT DOCUMENTS

| | | | |
|---|---|---|---|
| 5,438,355 A | 8/1995 | Palmer | |
| 5,931,949 A | 8/1999 | Perlman et al. | |
| 6,009,470 A | 12/1999 | Watkins | |
| 6,567,086 B1* | 5/2003 | Hashimoto | H04N 21/21805 345/427 |
| 6,631,418 B1 | 10/2003 | Watkins | |
| 7,027,655 B2* | 4/2006 | Keeney | H04N 19/115 375/E7.182 |
| 7,457,878 B1 | 11/2008 | Mathiske et al. | |
| 7,683,807 B2 | 3/2010 | Tomita et al. | |
| 7,752,083 B2 | 7/2010 | Johnson et al. | |
| 7,796,116 B2* | 9/2010 | Salsman | G06F 3/0346 345/158 |
| 7,852,317 B2 | 12/2010 | Grunnet-Jepsen et al. | |
| 7,864,159 B2 | 1/2011 | Sweetser et al. | |
| 8,421,746 B2* | 4/2013 | Igoe | H04L 12/2809 345/156 |
| 8,717,289 B2 | 5/2014 | McDevitt et al. | |
| 9,094,707 B2* | 7/2015 | McDevitt | G06F 3/038 |
| 9,294,556 B2* | 3/2016 | McDevitt | G06F 3/038 |
| 9,948,701 B2* | 4/2018 | McDevitt | G06F 3/038 |
| 2002/0064314 A1* | 5/2002 | Comaniciu | G06T 9/001 382/239 |
| 2003/0001908 A1* | 1/2003 | Cohen-Solal | H04N 5/45 715/863 |
| 2004/0049530 A1 | 3/2004 | Lok et al. | |
| 2005/0132420 A1* | 6/2005 | Howard | G06F 3/017 725/135 |
| 2006/0008117 A1 | 1/2006 | Kanada | |
| 2006/0290823 A1* | 12/2006 | Kondo | H04N 5/4403 348/734 |
| 2007/0085824 A1 | 4/2007 | Hong et al. | |
| 2007/0229465 A1 | 10/2007 | Sakai et al. | |
| 2008/0052750 A1* | 2/2008 | Grunnet-Jepsen | H04N 7/17318 725/109 |
| 2008/0184128 A1 | 7/2008 | Swenson et al. | |
| 2009/0051573 A1 | 2/2009 | Tomita et al. | |
| 2009/0109241 A1* | 4/2009 | Tsujimoto | H04N 7/18 345/633 |
| 2009/0245568 A1* | 10/2009 | Thelen | G06F 3/0346 382/100 |
| 2010/0162303 A1 | 6/2010 | Cassanova | |
| 2010/0174421 A1* | 7/2010 | Tsai | G06F 1/1616 700/302 |
| 2011/0063511 A1* | 3/2011 | Karaoguz | G06F 3/0304 348/564 |
| 2011/0157231 A1* | 6/2011 | Ye | G09G 3/20 345/649 |
| 2013/0080916 A1 | 3/2013 | Lopez et al. | |
| 2016/0156705 A1* | 6/2016 | McDevitt | G06F 3/038 709/219 |
| 2018/0198849 A1* | 7/2018 | McDevitt | G06F 3/038 |

\* cited by examiner

SYSTEM AND METHOD FOR INTEGRATING AN ELECTRONIC POINTING DEVICE INTO DIGITAL IMAGE DATA

CROSS REFERENCE TO RELATED APPLICATION

This application is a continuation of U.S. patent application Ser. No. 15/040,021, filed Feb. 10, 2016, which is a continuation of U.S. patent application Ser. No. 14/712,269, filed May 14, 2015, and issued as U.S. Pat. No. 9,294,556 on Mar. 22, 2016, which is a continuation of U.S. patent application Ser. No. 14/218,186, filed Mar. 18, 2014, and issued as U.S. Pat. No. 9,094,707 on Jul. 28, 2015, which is a continuation of U.S. patent application Ser. No. 13/165,364, filed on Jun. 21, 2011, and issued as U.S. Pat. No. 8,717,289 on May 6, 2014, which claims priority to U.S. Provisional Application No. 61/357,379, entitled System and Method for Integrating an Electronic Pointing Device Into a Video Feed, filed on Jun. 22, 2010, the contents of each of which are incorporated herein by reference into the present application.

BACKGROUND OF THE INVENTION

Commerce may be conducted in numerous venues. In particular, commerce may be conducted in real space or electronically, i.e., e-commerce. E-commerce is conducted via a computer network. Servers are used to store product and transaction information and computer terminals are used by purchasers to access the information stored in the server to view and modify such information via a transaction.

E-commerce may also be conducted in the context of interactive television. One exemplary implementation of interactive television is using set-top boxes or the like that may be programmed for bidirectional communication with a content provider. For example, a set-top box may receive content from a content provider and display the received content on a television (TV) or similar such device for viewing. The development of interactive television has enabled companies to provide consumers with options regarding many different products and information about those products. For example, a consumer using an interactive television application, such as HSN Shop By Remote®, may often be able to browse through thousands of different products from the convenience of his or her own home.

Challenges with providing so much information and content to a consumer includes the creation of a browsing and selection process that is both easy to use and fast. While television remote controls generally provide a suitable means for a user to navigate through different content and applications, it can often be difficult moving the cursor to the appropriate location to select a given item when there are many possible selections available at a given time. The multiple button remotes with up and down arrows can be inefficient to a user who wants to quickly navigate through numerous selections to arrive at his or her desired selection. Some remote controls have developed three-dimensional ("3D") pointing techniques to alleviate these issues. For example, certain remote control devices provide 3D capabilities that enable a user to move in three dimensions in front of a display screen. However, in general, the viewing device (or a console connected to the viewing device) also must include specially configured hardware that enables the viewing device to receive positional data transmitted by the remote control as well as unique software that can process this positional data as desired.

SUMMARY OF THE INVENTION

Accordingly, what is needed is a system that enables remote control pointing techniques to interact with regular viewing devices that are not specially configured to receive and process remote control data. Thus, the system and method disclosed herein provides an integration technique that combines position data from the pointing device with the digital image content before the information is displayed on a viewing device. Specifically, a system and method are provided that integrates an electronic pointer into digital image data, such as a video feed or software application, that is displayed on a screen. In one embodiment, the processing can be performed at a remote location. In this instance, a receiver at the remote location is provided that receives position data from a pointing device; a calibration unit then calculates the position of the pointing device relative to the screen based on the position data; and a processor then generates the electronic pointer based on the calculated position of the pointing device. Thereafter, the electronic pointer is integrated in the digital image data such that the video screen displays the electronic pointer at a location on the video screen that reflects the relative position of the pointing device to the video screen. In an alternative embodiment, the viewing device (e.g., the video screen) can include local processing capabilities that can integrate the digital image data, such as a video feed (e.g., standard broadcast, DBS, cable delivered video or the like), with the electronic pointer and related content from the remote location. In one further refinement, the pointing device communicates directly with the viewing device, which in turn communicates with the remote location.

DETAILED DESCRIPTION OF THE INVENTION

The following detailed description outlines possible embodiments of the proposed system and method disclosed herein for exemplary purposes. The system and method are in no way intended to be limited to any specific combinations of hardware and software. As will be described below, the inventive system and method relate to a pointing device that enables a user to dynamically integrate a pointing indicator into a video feed or application or similar digital image data. The rendered pointer can be placed on various screen locations that correspond to the user's intended movement of the pointing device. For example, if the user moves the pointing device in a specific direction with respect to a viewing device, the rendered pointer on the screen of the viewing device will move according to the user's movement. Additional dynamic functionality (e.g., purchase an item, request information, select another video stream, play a game, etc.) can be triggered by "clicking", hovering over, or "selecting" a location pointed to, or by inputting additional data using the pointing device.

Figure 1:
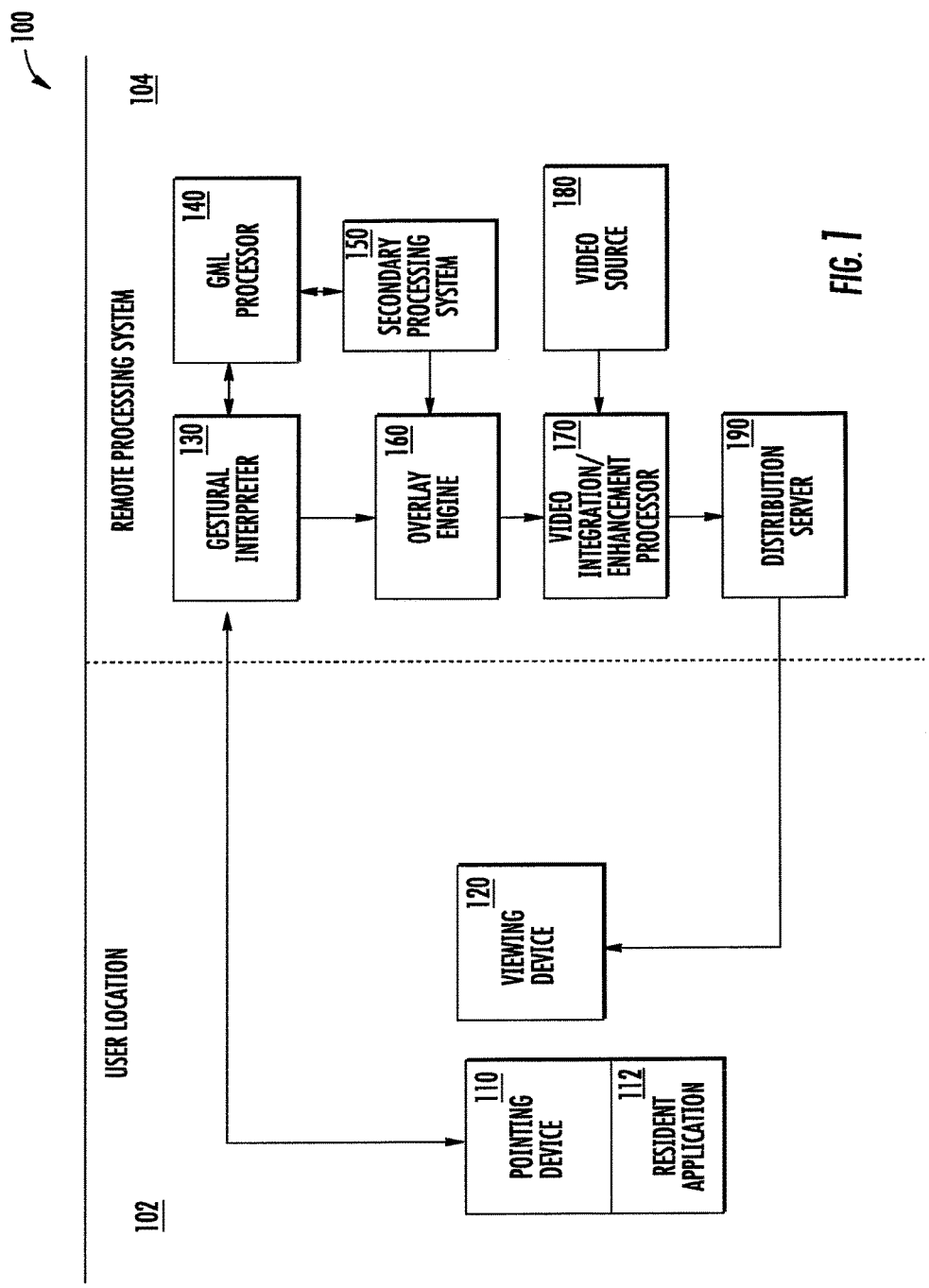
FIG. 1 illustrates block diagram of a system for integrating an electronic pointer into digital image data in accordance with an exemplary embodiment.

FIG. 1 illustrates a block diagram of the system 100 for integrating an electronic pointer into a video feed. In general, system 100 is divided into a user location 102 and a remote processing system 104. The user location 102 can be considered any location in which a user of a pointing device 110 is capable of viewing a video feed or application on a viewing device 120. Moreover, the remote processing system 104 can be associated with a secondary processing system (e.g., a product supplier) and/or content provider that is capable of processing data transmitted to and from the user location 102. A general illustration of the relationship between a user location, a product supply server, i.e., secondary processing system, and a content provider is discussed in U.S. Pat. No. 7,752,083 to Johnson et al., issued on Jul. 6, 2010, and entitled "METHOD AND SYSTEM FOR IMPROVED INTERACTIVE TELEVISION PROCESSING," which is hereby incorporated in its entirety by reference thereto.

As shown in FIG. 1, user location 102 includes pointing device 110 that is configured to remotely communicate with gestural interpreter 130 of remote processing system 104 via any appropriate data communication method (e.g., wifi, G3/G4, IP enabled, etc.). In the exemplary embodiment, pointing device 110 can be any device that can support running a software application (e.g., resident application 112), that is a connected device (i.e., can pass or pass and receive data directly or indirectly to remote processing system 104), and has the ability to measure and report on its relative position, movement, or inclination. Although such position and movement sensors are generally well known in the art, the sensors provided in pointing device 110 may include at least one of: an accelerometer, a touch sensor, a gyroscope, a magnetometer, an optical sensor, an inertial tracker and the like. Furthermore, position, movement and user input data can also be generated with a touch screen, mouse ball or the like on pointing device 110. Such data can be generated independently or concurrently with the position and movement sensors. Specific examples of pointing devices 110 can be an iPhone® or an Android® phone or the like, although it should be understood that the system and method described herein is in no way intended to be limited to these particular data communication devices. Additionally, pointing device 110 can be provided with the ability to input data (e.g., "clicks" or alphanumeric key presses), as well as a receiver capable of receiving feedback from remote processing system 104.

As further shown in FIG. 1, user location 102 comprises viewing device 120 that is connected to a video and audio content delivery system (e.g., IP data stream) and is capable of displaying a video feed and/or an application. It should be understood that viewing device 120 can be any suitably appropriate device capable of viewing a video feed/application, including, but not limited to, a computer, PDA, laptop computer, notebook computer, television, viewing device with a set-top box type processor (internal or external to the viewing device), a Blu-ray player, a video game console (internal or external to a television or the like), or any other device that can receive, send, and store data and display video content on a screen. The present system contemplates (as will be discussed in detail below) that after a series of calibration and integration steps, system 100 can create an interactive and responsive environment between pointing device 110 and viewing device 120 such that pointing device 110 can manipulate and/or navigate the content displayed on viewing device 120 via a modified video feed and/or application.

As mentioned above, system 100 of FIG. 1 further comprises remote processing system 104. As shown, remote processing system 104 includes gestural interpreter 130, gestural mark-up language processor 140 (hereinafter "GML processor 140"), a secondary processing system 150, an overlay engine 160, a video integration/enhancement processor 170, a video source 180, and a distribution server 190. In general, remote processing system 104, through various interaction of the components that will be described in detail below, is capable through a series of calibration points, calculations, clicks, and cycles, to establish the position of pointing device 110 relative to viewing device 120. Using this relative location, remote processing system 104 can then create an electronic pointer and integrate the electronic pointer with a video feed before the video feed is subsequently transmitted to viewing device 120. The electronic pointer is integrated with the video feed such that the screen of viewing device 120 displays the modified video feed with the electronic pointer in a location of the screen that reflects the relative position of the pointing device. Moreover, system 100 employs a feedback loop that constantly updates the on-screen pointer location in reaction to gestural movements of the pointing device.

Specifically, with reference to the components of remote processing system 104, gestural interpreter 130 is a system that includes a receiver configured to receive position and movement data from resident application 112 of pointing device 110, in which the position data relates to the movement and relative position of pointing device 110 and is generated by the applicable sensors and/or user inputs on pointing device 110. As discussed above, it is noted that while position data is related to the physical position and movement of pointing device 110 in the preferred embodiment, the position data could also relate to the position as indicated on a touch screen of pointing device 110 in an alternative embodiment. In that embodiment, a user is able to manipulate the location of the electronic pointer using the touch screen as opposed to actually moving pointing device 110. Furthermore, as noted above, both types of data can be generated by pointing device 110 and processed at remote processing system 104 accordingly.

In addition, gestural interpreter 130 can include a transmitter that is configured to transmit feedback data to pointing device 110. This feedback data can be in response to the user's movement of pointing device 110 as well as the various inputs selected by the user via pointing device 110. For example, if a user moves pointing device 110 to a position that would correspond to a location that is outside the boundary of the screen of viewing device 120, feedback data may be provided by gestural interpreter 130 to pointing device 110 that can cause pointing device 110 to vibrate to serve as an indication that the user has moved outside the boundary of the video screen.

Furthermore, as shown in FIG. 1, gestural interpreter 130 is communicatively coupled to GML processor 140 and overlay engine 160 and is configured to provide the data relating to the pointing indicator location and/or motion information to these respective components. GML processor 140 can serve as an intermediary and translator between the gestural interpreter 130 and other secondary processor systems (e.g., secondary processing system 150) passing the relevant data in both directions. Secondary processing system 150 can be associated and/or provided by a product supply server, such as HSN Shop By Remote®. As noted above, examples of product supply servers and their interaction with content providers and remote user locations are described in U.S. Pat. No. 7,752,083. As further shown in FIG. 1, secondary processing system 150 is communicatively coupled to GML processor 140 and overlay engine 160. Secondary processing system 150 can contain software programs/logic that use data from GML processor 140 to create response data, which is in turn passed to overlay engine 160. In addition, secondary processing system 150 is configured to pass data back through GML processor 140, gestural interpreter 130, and/or pointing device 110. For example, based on a user's input to pointing device 110, secondary processing system 150 can generate response data that is ultimately used to generate the feedback data (discussed above) that is provided to pointing device 110.

Overlay engine 160 is a processor that is configured to integrate the response data from secondary processing system 150 and the positional information from pointing device 110 to generate a dataset that can be rendered on a specific location on the video stream. This data set is then provided to a video integration/enhancement processor 170 that is configured to render the data from overlay engine 160 into the video feed provided by video source 180, creating a new integrated video stream. In one aspect of this embodiment, data can be rendered into an application provided by secondary processing system 150. In addition, video source 180 can be a content provider, such as that discussed above as well as with reference to U.S. Pat. No. 7,752,083, that is generated for one or more users.

The new integrated video stream (i.e., the video feed integrated with the electronic pointer) is delivered to the distribution server 190, which, in turn, is configured to transmit the new integrated video stream to viewing device 120 that is associated with the pointing device 110. The new integrated video stream can be transmitted to viewing device 120 using any appropriate data communication method (e.g., wifi, G3/G4, IP enabled, etc.). Viewing device 120 is, in turn, configured to display the integrated video stream on a screen. While the exemplary embodiment contemplates that the video pointer is displayed when it is integrated with the video feed, it should be understood that in one refinement, the video pointer can be invisible. That is, the position, movement and/or user selection data is all machine recognized, (i.e., processed to generate the video pointer and integrated with the video feed), but the actual video pointer is not displayed on the screen. Thus, a user can still move the pointer within the video feed and make desired selections. In this refinement, it is further contemplated that as the user moves the video pointer to specific locations on the video feed that are selectable (e.g., a user input to make a purchase), that location is highlighted on the screen.

It should be understood that while the various components are described to be part of remote processing system 104, it is in no way intended that these components all be located at the same physical location. For example, secondary processing system 150 and overlay engine 160 may be located at a product supply server location whereas video source 180 and distribution server 190 may be located at a content provider.

Once the electronic pointer is initially integrated on the video feed and/or application, a feedback loop is created using the foregoing components that constantly updates the on-screen pointer location in reaction to the user's gestural movements of pointing device 110 and/or touch screen inputs. As discussed in detail above, if the individual points to and "clicks" on various screen locations, these locations and clicks are interpreted by GML processor 140, which can then pass the related action or data requests to secondary processing system 150 and associated video processing logic. In turn, the results or responses from secondary processing system 150 are delivered to overlay engine 160, and the new content is dynamically integrated into the video stream and delivered back to the viewing device 120.

It is further noted that while each of the components described in remote processing system 104 is provided with one or more specific functions, each component is by no means intended to be limited to these functions. For example, different components can provide different processing functions within the context of the invention and/or a single component can perform both those functions described above with respect to the exemplary embodiment as well as other function performed by different components as described above with respect to the exemplary embodiment.

Finally, it should be understood that each of the aforementioned components of remote processing system 104 comprise all requisite hardware and software modules to enable communication between each of the other respective components. These hardware components can include conventional I/O interfaces, such as modems, network cards, and the like. Such hardware components and software applications are known to those skilled in the art and have not been described in detail so as not to unnecessarily obscure the description of the invention herein. Moreover, program instructions for each of the components can be in any suitable form. In particular, some or all of the instructions may be provided in programs written in a self-describing computer language, e.g., Hyper Text Markup Language (HTML), eXtensible Markup Language (XML) or the like. Transmitted program instructions may be used in combination with other previously installed instructions, e.g., for controlling a manner of display of data items described in a received program markup sheet.

Figure 2:
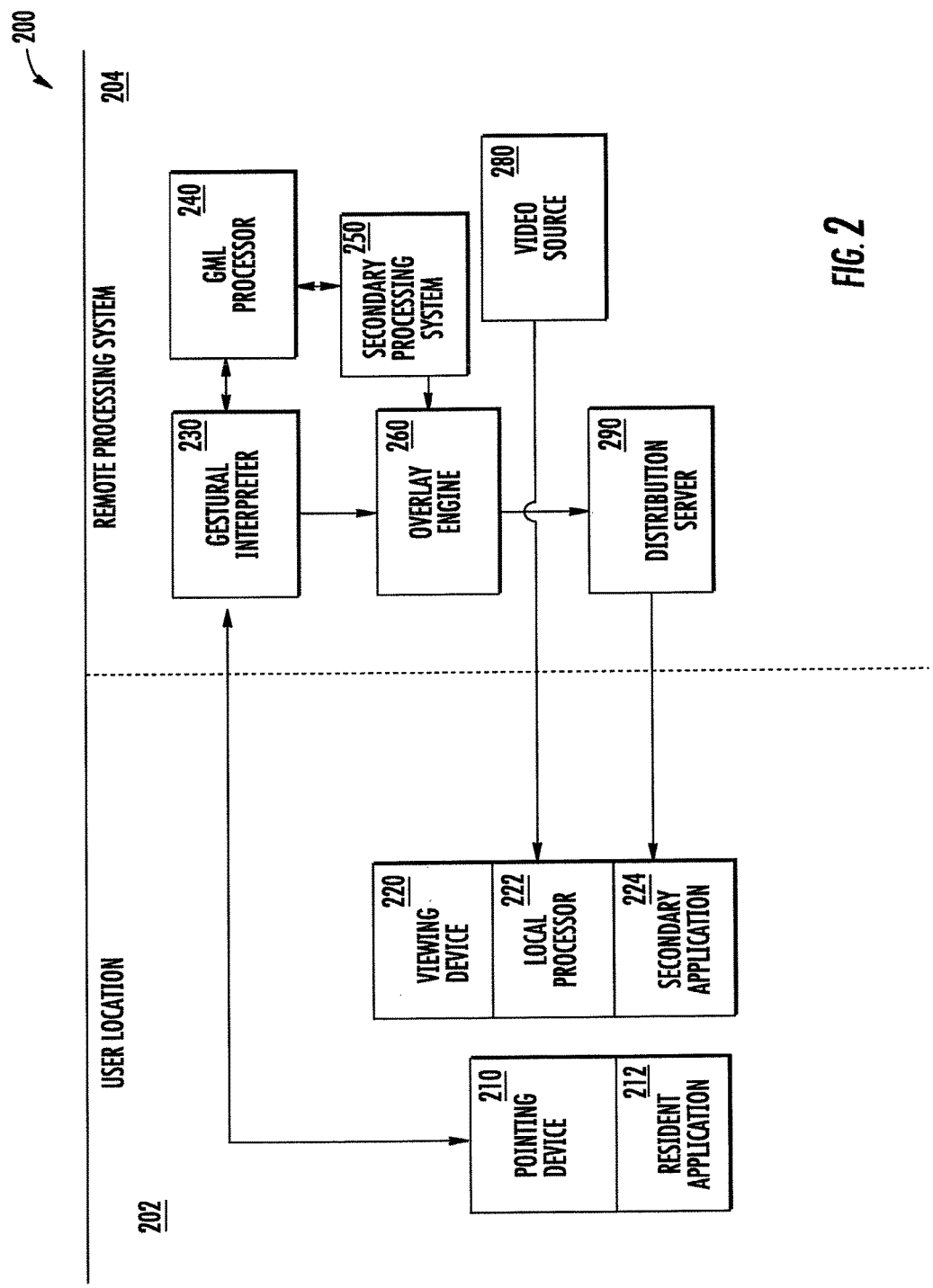
FIG. 2 illustrates block diagram of a system for integrating an electronic pointer into digital image data in accordance with an exemplary embodiment.

FIG. 2 illustrates block diagram of a system 200 for integrating an electronic pointer into a video feed in accordance with another exemplary embodiment. As shown, system 200 comprises substantially similar components as those described above with respect to FIG. 1. For example, system 200 is generally divided into a user location 202 and a remote processing system 204. In addition, pointing device 210 with resident application 212 is provided at user location 202 as well as viewing device 220 similar to that described above with respect to FIG. 1. Pointing device 210 and resident application 212 are configured to perform substantially the same functions as those discussed above with respect to pointing device 110 and resident application 112, respectively, of FIG. 1. Moreover, similar to FIG. 1, remote processing system 204 comprises gestural interpreter 230, GML processor 240, secondary processing system 250, overlay engine 260, video source 280 and distribution server 290. In this exemplary embodiment, each of these components are provided to perform substantially the same functions as those discussed above with regard to the respective components shown in FIG. 1.

As discussed above with respect to viewing device 120 of FIG. 1, viewing device 220 comprises a video screen capable of displaying a video feed and/or application from an outside source (e.g., video source 280). However, in the exemplary embodiment illustrated in FIG. 2, viewing device 220 further comprises local processor 222 and secondary application 224. Essentially, with these components, the embodiment of FIG. 2 is similar to the exemplary embodiment of FIG. 1, except that the video feed is delivered directly to viewing device 220, and more particularly, local processor 222. Local processor 222 is configured to integrate the video source 280 (e.g., standard broadcast, DBS, cable delivered video or the like) with the electronic pointer and related content from distribution server 290 onto the screen of viewing device 220, effectively rendering a combined new video content stream on viewing device 220. Moreover, secondary application 224 is an application provided by (or associated with) secondary processing system 250 that enables the specific interaction between the pointing device and the application provided by secondary processing system 250. An example of such a secondary application is HSN's point and shop features discussed in U.S. Provisional Patent Application No. 61/433,755 to McDevitt, filed on Jan. 18, 2011, and entitled "SYSTEM AND METHOD FOR RECOGNITION OF ITEMS IN ELECTRONIC MEDIA DATA AND DELIVERY OF INFORMATION RELATED THERETO," which is hereby incorporated in its entirety by reference thereto. It is noted that while local processor 222 is described in the exemplary embodiment as integrated into viewing device 220, it should be understood to those skilled in the art that local processor 222 can also be provided as a "stand-alone" component.

Figure 3:
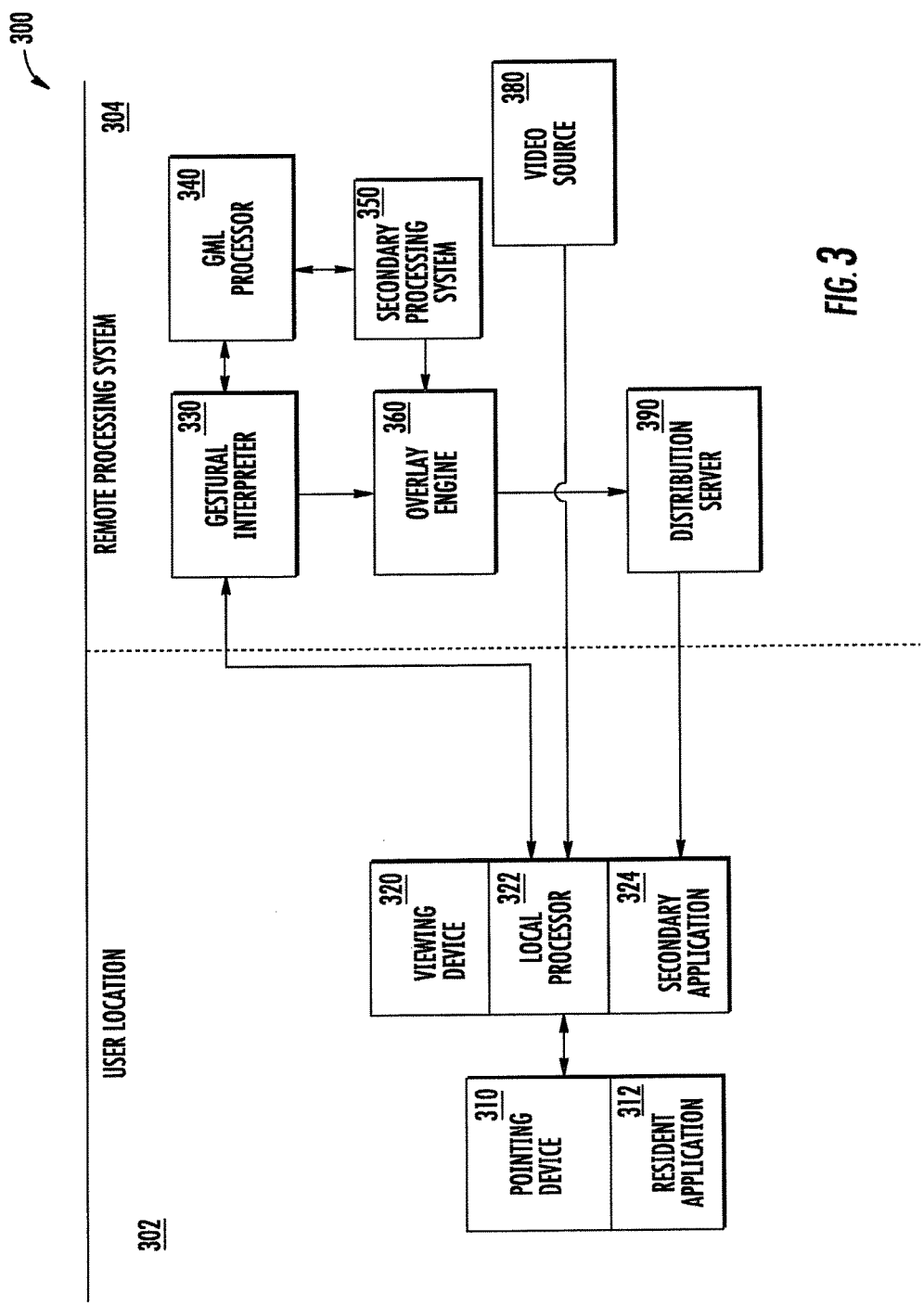
FIG. 3 illustrates block diagram of a system for integrating an electronic pointer into digital image data in accordance with an exemplary embodiment.

FIG. 3 illustrates block diagram of a system 300 for integrating an electronic pointer into a video feed and/or application in accordance with yet another exemplary embodiment. As shown, system 300 comprises substantially similar components as those described above with respect to FIGS. 1 and 2. For example, system 300 is generally divided into a user location 302 and a remote processing system 304. In addition, pointing device 310 with resident application 312 is provided at user location 302 as well as viewing device 320 similar to that described above with respect to FIGS. 1 and 2. Pointing device 310 and resident application 312 are configured to perform substantially the same functions as those discussed above with respect to the respective pointing devices 110, 210 and resident applications 112, 212 of FIGS. 1 and 2, respectively. Moreover, similar to FIGS. 1 and 2, remote processing system 304 comprises gestural interpreter 330, GML processor 340, secondary processing system 350, overlay engine 360, video source 380 and distribution server 390. In this exemplary embodiment, each of these components are provided to perform substantially the same functions as those discussed above with regard to the respective components shown in FIGS. 1 and 2, respectively.

The primary distinction between the exemplary embodiments of FIGS. 1 and 2 and the embodiment of FIG. 3 is that pointing device 310 communications directly with viewing device 320 via a Wifi connection or the like, instead of communicating directly to remote processing system 304. In turn, viewing device 320 is configured to communicate remotely with remote processing system 304, and, specifically, to transmit position data to gestural interpreter 330 and receive feedback data from gestural interpreter 330. Otherwise, the functionality of the system 300 is generally the same as systems 100 and 200 of FIGS. 1 and 2, respectively. In other words, local processor 322 is configured to integrate an electronic pointer with a video feed or an application such that the screen of viewing device 320 displays the modified video feed or application with the electronic pointer in a location of the screen that reflects the relative position of the pointing device. Also, similar to secondary application 224 discussed above, secondary application 324 can be provided (or associated with) secondary processing system 350 that enables the specific interaction between the pointing device 310 and the application provided by secondary processing system 350.

Figure 4:
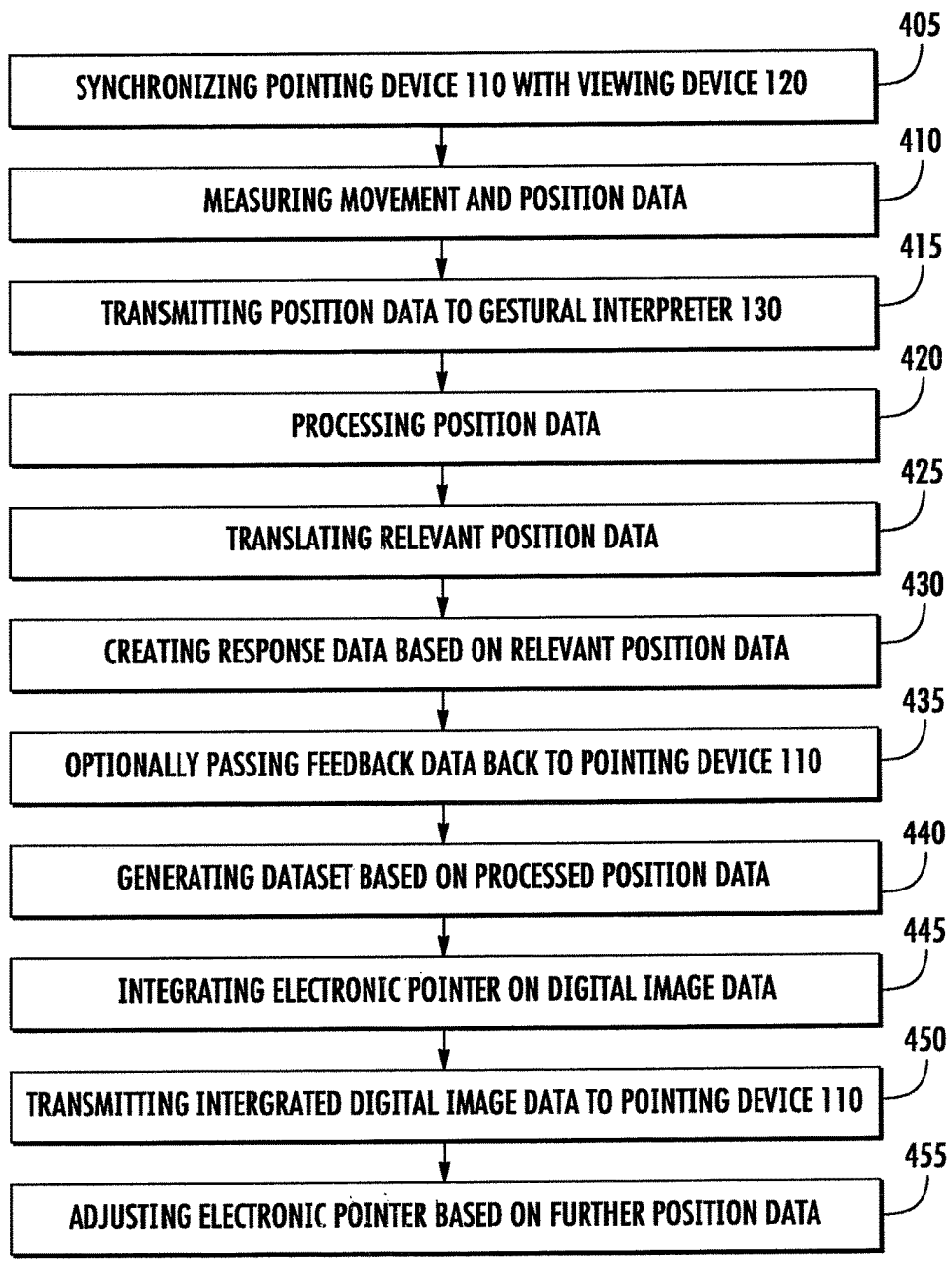
FIG. 4 illustrates a flowchart for a method for integrating an electronic pointer into digital image data in accordance with an exemplary embodiment.

Referring now to FIG. 4, a flowchart for a method for integrating an electronic pointer into a video feed and/or application in accordance with an exemplary embodiment. The following method is described with respect to the components of FIG. 1 and their associated functionality as discussed above. As shown in FIG. 4, initially, at step 405, pointing device 110 is synchronized with viewing device 120. This synchronization can be performed by the user who can initiate an application on pointing device 110 which in turn communicates this information to remote processing system 104. The IP address of pointing device 110 can then be matched to the known IP address of viewing device 120 such that remote processing system 104 recognizes that the user of pointing device 110 is currently attempting to interact with viewing device 120 via the movement and inputs of pointing device 110. It should be appreciated that while the synchronization step is described with respect to the association of IP addresses, similar techniques as known to those skilled in the art can be used to synchronize pointing device 110 and viewing device 120.

Next, at step 410, pointing device 110 collects movement and location/position data using various sensors, such as an accelerometer, gyroscope and the like, as described above. This data is then transmitted as position data to gestural interpreter 130 (step 415). In turn, gestural interpreter 130 processes the position data relating to pointing device 110 and passes the information to GML processor 140 (step 420). GML processor 140 serves as an intermediary and translator between the gestural interpreter 130 and other secondary processor systems (e.g., secondary processing system 150) passing the relevant data in both directions (step 425).

Next, at step 430, secondary processing system 150 creates response data employing software programs/logic, which is in turn passed to overlay engine 160. In one aspect of this embodiment, secondary processing system 150 optionally passes feedback data back to pointing device 110 (step 435). At step 440, overlay engine 160 processes the response data from secondary processing system 150 and the positional information from pointing device 110, via gestural interpreter 130 to generate a dataset that can be rendered on a specific location on the video stream. This data set is then provided to a video integration/enhancement processor 170 that renders the data into the video feed and/or application to create a new integrated video stream (step 445). Next, at step 450, this new integrated video stream is then transmitted by distribution server 190 to viewing device 120 that is associated with the pointing device 110, as a result of the synchronization step 405. As a result, the user of pointing device 110 is provided with a video feed and/or application on viewing device 120 that includes an electronic pointer that can be controlled by the user to navigate the video feed and/or application by entering inputs via pointing device 120.

Step 455 reflects the feedback loop associated with system 100 as discussed above. Each time the user moves pointing device 110 or makes an input using a "click" input or otherwise, this data is transmitted to remote processing system 104. Steps 410-450 are then repeated and the movement/input is reflected on the screen of viewing device 120. For example, any movement of pointing device 110 would be reflected as a corresponding movement of the electronic pointer on the screen of viewing device 120.

It should be understood that while the method illustrated in FIG. 4 corresponds to system 100 described in FIG. 1, similar such processing can be performed with respect to the systems 200 and 300 described above with respect to FIGS. 2 and 3, respectively. The main difference, which should be understood to those skilled in the art of data communication and data information processing, is where certain steps of the processing are performed and where the relevant data is transmitted based on these different infrastructures. For example, referring to FIG. 2, if viewing device 220 is a computer with a complex processor, e.g., local processor 222, then the integration step (step 445) can be performed at the viewing device 220 rather video integration/enhancement processor 170 of remote processing system 104 of FIG. 1. However, the other processing steps can still be performed by remote processing system 204. Accordingly, it should be understood to those skilled in the art that methods similar to that described above with respect to FIG. 4 can be modified to reflect the infrastructure of the systems illustrated in FIGS. 2 and 3.

Finally, it is noted that while the method has been described mainly with regard to the movement of pointing device 110, it is also contemplated that the control of the electronic pointer can be based on a user's manipulation of a touch screen of pointing device 110. As such, position data can be determined by the user's input via the touch screen and transmitted to the remote processing system 104 accordingly. Otherwise, the position data is processed using substantially similar techniques as those discussed above. Further, the method in FIG. 4 can equally be applied to this embodiment of the disclosed system.

While the foregoing has been described in conjunction with exemplary embodiments, it is understood that the term "exemplary" is merely meant as an example. Accordingly, the application is intended to cover alternatives, modifications and equivalents, which may be included within the spirit and scope of the system and method for integrating an electronic pointing device in a video feed as disclosed herein.

Additionally, in the preceding detailed description, numerous specific details have been set forth in order to provide a thorough understanding of the present invention. However, it should be apparent to one of ordinary skill in the art that the system and method for integrating an electronic pointing device in a video feed may be practiced without these specific details. In other instances, well-known methods, procedures, components, and circuits have not been described in detail so as not to unnecessarily obscure aspects of the system and method disclosed herein.

What is claimed is:

1. A system for creating a new video stream based on a physical position and movement of an electronic pointing device, the system comprising:
    a receiver configured to receive data from at least one sensor of an electronic pointing device relating to the physical position and movement of the electronic pointing device;
    at least one processor configured to:
        calculate the physical position and movement of the electronic pointing device based on the data received from the at least one sensor of the electronic pointing device,
        receive input data from one or more touch controlled sensors on the electronic pointing device,
        access additional information from a secondary source based on the input data received from the one or more touch controlled sensors, and
        create a new video stream based on an original video stream, the calculated physical position and movement of the electronic pointing device, and the accessed additional information from the secondary source; and
    at least one server configured to transmit the created new video stream to a viewing device to be displayed on a screen thereof.

2. The system of claim 1, wherein the at least one server is further configured to transmit feedback data to the electronic pointing device, in which the feedback data is generated in response to the calculated the physical position and movement of the electronic pointing device.

3. The system of claim 2, wherein the feedback data is configured to cause a vibration response by the electronic pointing device based on the calculated the physical position and movement of the electronic pointing device.

4. The system of claim 1, wherein the at least one sensor is one or more of an accelerometer, a gyroscope, a magnetometer, an optical sensor, and an inertial tracker.

5. The system of claim 1, wherein the one or more touch controlled sensors is at least one of a touch screen, mouse ball, clicker, and an entry key.

6. The system of claim 1, wherein the accessed additional information includes an electronic pointer rendered in the created new video stream displayed on the screen of the viewing device.

7. The system of claim 6, wherein the screen displays the electronic pointer at a location on the screen that reflects the calculated physical position of the electronic pointing device relative to the viewing device.

8. The system of claim 1, wherein the accessed additional information from the secondary source comprises at least one of an image, a video, a platform for playing a video game and a platform for purchasing a product relating to the original video stream.

9. The system of claim 1, wherein the at least one processor is further configured to execute a dynamic functionality in response to additional input data from the one or more touch controlled sensors on the electronic pointing device and related to the accessed additional information.

10. The system of claim 9, wherein the executed dynamic functionality comprises at least one of purchasing an item relating to the accessed additional information, requesting secondary information relating to the accessed additional information, selecting another video stream to be transmitted to the viewing device, and playing a game relating to the accessed additional information.

11. A method for creating a new video stream based on a physical position and movement of an electronic pointing device, the method comprising:
    receiving, by at least one server, data from at least one sensor of an electronic pointing device relating to the physical position and movement of the electronic pointing device;
    calculating, by at least one processor, the physical position and movement of the electronic pointing device based on the data received from the at least one sensor of the electronic pointing device;
    receiving, by the at least one server, input data from one or more touch controlled sensors on the electronic pointing device;
    accessing, by the at least one processor, additional information from a secondary source based on the input data received from the one or more touch controlled sensors;
    creating, by the at least one processor, a new video stream based on an original video stream, the calculated physical position and movement of the electronic pointing device, and the accessed additional information from the secondary source; and transmitting, by the at least one server, the created new video stream to a viewing device to be displayed on a screen thereof.

12. The method of claim 11, further comprising transmitting, by the at least one server, feedback data to the electronic pointing device, in which the feedback data is generated in response to the calculated the physical position and movement of the electronic pointing device.

13. The method of claim 12, further comprising causing, by the feedback data, a vibration response by the electronic pointing device based on the calculated the physical position and movement of the electronic pointing device.

14. The method of claim 11, wherein the at least one sensor is one or more of an accelerometer, a gyroscope, a magnetometer, an optical sensor, and an inertial tracker.

15. The system of claim 11, wherein the one or more touch controlled sensors is at least one of a touch screen, mouse ball, clicker, and an entry key.

16. The method of claim 11, wherein the accessed additional information includes an electronic pointer rendered in the created new video stream displayed on the screen of the viewing device.

17. The method of claim 16, further comprising, displaying, by the screen, the electronic pointer at a location on the screen that reflects the calculated physical position of the electronic pointing device relative to the viewing device.

18. The method of claim 11, wherein the accessed additional information from the secondary source comprises at least one of an image, a video, a platform for playing a video game and a platform for purchasing a product relating to the original video stream.

19. The method of claim 11, further comprising executing, by the at least one processor, a dynamic functionality in response to additional input data from the one or more touch controlled sensors on the electronic pointing device and related to the accessed additional information.

20. The method of claim 19, wherein the executed dynamic functionality comprises at least one of purchasing an item relating to the accessed additional information, requesting secondary information relating to the accessed additional information, selecting another video stream to be transmitted to the viewing device, and playing a game relating to the accessed additional information.

21. A system for creating a new video stream based on a physical position and movement of a wireless electronic device, the system comprising:

a receiver configured to receive data from at least one sensor of the wireless electronic device relating to the physical position and movement of the wireless electronic device;

a physical position and movement calculating processor configured to calculate the physical position and movement of the wireless electronic device based on the data received from the at least one sensor of the wireless electronic device;

an information accessing processor configured to access additional information from a secondary source based on input data received from one or more touch controlled sensors on the wireless electronic device;

a video stream modifying processor configured to create a new video stream based on an original video stream, the calculated physical position and movement of the wireless electronic device, and the accessed additional information from the secondary source; and at least one server configured to transmit the created new video stream to a viewing device to be displayed on a screen thereof.

22. The system of claim 21, wherein the at least one server is further configured to transmit feedback data to the wireless electronic device, in which the feedback data is generated in response to the calculated the physical position and movement of the wireless electronic device.

23. The system of claim 22, wherein the feedback data is configured to cause a vibration response by the wireless electronic device based on the calculated the physical position and movement of the wireless electronic device.

24. The system of claim 21, wherein the at least one sensor is one or more of an accelerometer, a gyroscope, a magnetometer, an optical sensor, and an inertial tracker.

25. The system of claim 21, wherein the one or more touch controlled sensors is at least one of a touch screen, mouse ball, clicker, and an entry key.

26. The system of claim 21, wherein the accessed additional information includes an electronic pointer rendered in the created new video stream displayed on the screen of the viewing device.

27. The system of claim 26, wherein the screen displays the electronic pointer at a location on the screen that reflects the calculated physical position of the wireless electronic device relative to the viewing device.

28. The system of claim 21, wherein the accessed additional information from the secondary source comprises at least one of an image, a video, a platform for playing a video game and a platform for purchasing a product relating to the original video stream.

29. The system of claim 21, wherein the video stream modifying processor is further configured to execute a dynamic functionality in response to additional input data from the one or more touch controlled sensors on the wireless electronic device and related to the accessed additional information.

30. The system of claim 29, wherein the executed dynamic functionality comprises at least one of purchasing an item relating to the accessed additional information, requesting secondary information relating to the accessed additional information, selecting another video stream to be transmitted to the viewing device, and playing a game relating to the accessed additional information.

* * * * *